(No Model.)
L. GRUBMAN.
KINETOGRAPHIC CAMERA.
No. 587,729. Patented Aug. 10, 1897.
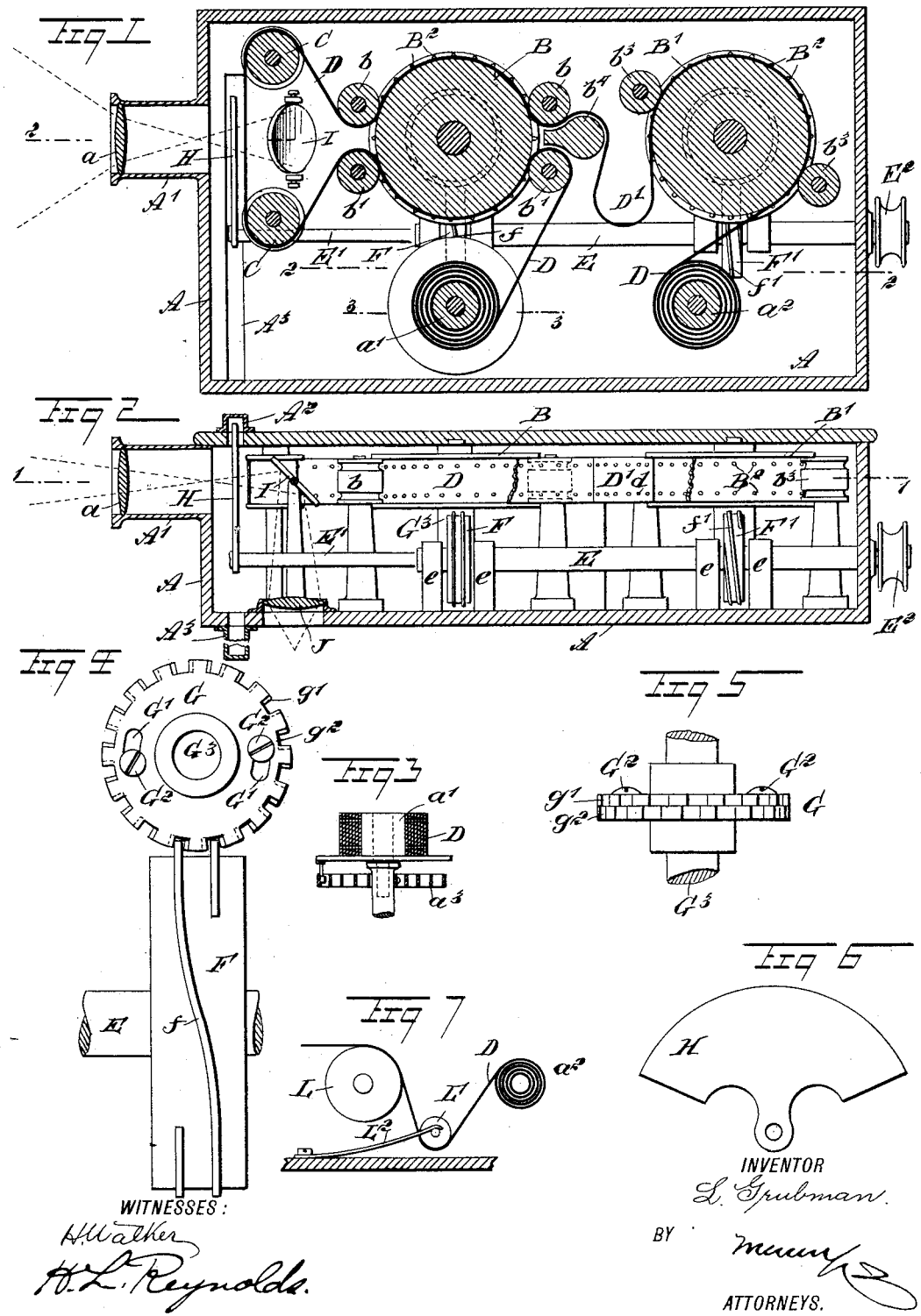
WITNESSES:
H. Walker
H. L. Reynolds.
INVENTOR
L. Grubman
BY
ATTORNEYS.

United States Patent Office.

LEO GRUBMAN, OF NEW YORK, N. Y.

KINETOGRAPHIC CAMERA.

SPECIFICATION forming part of Letters Patent No. 587,729, dated August 10, 1897.

Application filed December 22, 1896. Serial No. 616,575. (No model.)

*To all whom it may concern:*

Be it known that I, LEO GRUBMAN, of New York city, in the county and State of New York, have invented a new and Improved Series Photographic Device, of which the following is a full, clear, and exact description.

My invention relates to that class of photographic devices intended to take in succession upon a ribbon film a series of pictures of a scene or moving object, each picture being separated from the next by a very short period of time. It is also adapted to be used as a projector or lantern for projecting the pictures produced in this manner upon a screen.

Reference is to be had to the accompanying drawings, forming a part of this specification, in which similar characters of reference indicate corresponding parts in all the views.

Figure 1 is a sectional view of the device, taken on the line 1 1 in Fig. 2. Fig. 2 is a sectional view of the device, taken on the line 2 2 in Fig. 1. Fig. 3 is a sectional view of the revolving roller and the spring for operating it. Fig. 4 is a plan view of the peculiar worm-wheel and worm for operating the feed-wheel. Fig. 5 is an edge view of the worm-wheel. Fig. 6 is a plan view of the shutter used for interrupting the light, and Fig. 7 is a view of a modified construction of one of the feed-wheels.

My device is inclosed in a box A, which should be light-proof in order to prevent the action of the light upon the film before exposure. This box A is provided with a tube A' at one end, said tube having a lens $a$ therein. The box is also provided with two feed-wheels B and B', provided upon their circumference with a series of small projections or pins $B^2$, which engage holes $d$ in the prepared film. By this means the slipping of the film is prevented and the exact registering and feeding thereof may be obtained.

The feed-wheel $B^2$ takes the film D from a supply-roller $a^2$. As the film passes about the feed-wheel B' it passes beneath the rollers $b^3$, which serve to hold the film D tightly upon the surface of the feed-wheel B'. This feed-wheel B' is turned by the engagement of the thread $f'$ of a worm F' on a shaft E, journaled in supports $e$ in the box A, below the feed-wheel B', with an ordinary worm-wheel mounted on the shaft of the feed-wheel B'. The worm-wheel is shown in Fig. 1 in dotted lines. The thread $f'$ on the worm F' is of a constant pitch, and consequently gives the feed-wheel B' a constant steady motion.

Between the feed-wheel B' and the feed-wheel B the film D is formed into a loop D' to provide for the intermittent feeding action of the wheel B. The film passes over a guide $b^4$ and then beneath another guide-roller $b$. After passing about a considerable segment of the wheel B the film passes beneath another guide-roller $b$ and then about the two rollers C, which I have herein called the "exposing-rollers," as their function is to present the film to the image produced by the lens and hold the film in position while the picture is taken. These rollers C are separated from each other some little distance, for a purpose hereinafter explained. After passing about the second of these rollers C the film is passed over the guide-roller $b'$, which holds the film in contact with the surface of the feed-wheel B. The film is then carried about with the feed-wheel B until it passes over a second guide-roller $b'$, from which point it is carried to the revolving take-up roller $a'$, having a controlling-spring $a^3$, as shown in Fig. 3.

It will be seen that the film is held in contact with the opposite sides of the feed-wheel B before and after exposure and that the said wheel acts upon the ribbon to draw it from the first wheel B' and over the exposing-rollers C. By this construction it is possible to place the feed-rollers and the exposing-rollers all in the same line, and thus to make a compact and small device.

The feed-wheel B is given an intermittent motion by the following mechanism: A worm-wheel G (shown in detail in Fig. 4 and of the same construction as that attached to the shaft of the feed-wheel B') is attached to the same shaft as the feed-wheel B. This wheel consists of two plates $g'$ and $g^2$, which are provided with teeth registering with each other. One of these plates is provided with slots G', through which pass screws $G^2$ into the other plate. By this means the plates may be adjusted angularly with reference to each other, and the width of the opening or the space between the teeth may be accurately adjusted.

This wheel is engaged by the thread $f$ upon a worm F, mounted upon the shaft E, being the same shaft as carries the worm F', which operates the wheel B'. This flange $f$ is, however, a cam-flange. Throughout the greater part of its distance it conveys no rotative effect to the wheel G, but holds it exactly in the same position. At one point, however, it bends to one side and shifts to a degree exactly equal to the pitch of the teeth of the wheel G. In consequence the wheel G is given an intermittent forward movement and is held fixed during the remainder of the rotation of the worm F. This mechanism is so proportioned that the ribbon will be advanced a distance exactly equal to the space occupied by each picture.

The shaft E, as shown in the drawings, is provided with a pulley $E^2$ outside the box, by which it may be connected with any suitable rotative means. The opposite end E' of the shaft carries a shutter H, which revolves in the path of the image produced by the lens and cuts the same off from the film while the film is being moved. Casings $A^2$ and $A^3$, extending above and below the box or casing A, are provided for the shutter H when the box A is not sufficiently large to allow of the revolution of the shutter.

The mechanism so far described is all that is necessary for making the exposures. To use this device as a projector, I provide a mirror I, located near the film D and between the rollers C. A lens J is provided in one side of the box A, through which a strong beam of light may be projected upon the mirror I, where it will be reflected through the film and the lens $a$ upon a screen. In this way the same mechanism may be used as a camera for taking pictures originally and then as a projector or lantern for exhibiting the same. In the latter use, however, the shutter H is not necessary and may be removed from the shaft E.

The modification shown in Fig. 7 is intended to avoid the necessity of the feed-wheel B' and its connecting mechanism. In this modification a guide-roller L is provided for conducting the film to the feed-wheel B. A small roller L', supported upon spring-arms $L^2$, is located between the supply-roller $a^2$ and the guide-roller L. This roller L' yields when the feed-roller B is rotated, and thus prevents undue strain upon the film D. The supply-roller $a^2$ may be connected to the mechanism in such a way as to be rotated thereby, or the rotation may be secured by means of the feed-wheel B' and a spring-roller L'.

By utilizing the feed-wheel B for engaging the film both before and after its exposure a double-feeding effect is obtained upon the film by the use of a single wheel, and the strain upon the film is correspondingly reduced. The construction of the worm-wheel described makes it possible to adjust it to take up wear and so as to closely embrace the sides of the feeding-flange, thus avoiding slack or lost motion and yet render its operation free and without undue friction.

The course of the film about the rollers and the use of a positive feed device upon the feed-wheels prevent any possibility of scratching or injuring the surface of the film, as would be probable with any form of feeding and guiding device which had a sliding contact with the film at any point or in which the engagement of the feed device with the film is not positive.

Having thus described my invention, I claim as new and desire to secure by Letters Patent—

1. In a series photographic device, an intermittently-operated feed-wheel, and means for engaging the film therewith both before and after exposure, substantially as described.

2. In a series photographic camera, the combination of a feed-wheel and mechanism for giving it intermittent rotation, with guide-pulleys whereby the film is engaged with one side of the feed-wheel before exposure and the other side after exposure, substantially as described.

3. In a series photographic camera, the combination of a feed-wheel and mechanism for giving it an intermittent motion, with guiding means for removing the film from the surface of the feed-wheel at one point and for returning the same to the wheel after exposure to the light-image, substantially as described.

4. In a series photographic camera, the combination of a feed-wheel adapted to engage the film to advance it, with a pair of adjacent guide-rollers holding the film to the feed-wheel, and two separated rollers adapted to receive the film from one of the guide-rollers, to present it before the lens and to deliver it to the other guide-roller, substantially as described.

5. In a series photographic device, the combination of a feed-wheel receiving a film from a supply-roll, means for rotating the feed-wheel, and a second feed-wheel having intermittent rotating means, with a pair of guide-rollers holding the film in contact with a segment of the intermittent feed-wheel, a pair of exposing-rollers receiving the film from the intermittent feed-wheel, and a second pair of guide-rollers receiving the film from the exposing-rollers and holding it in contact with a different segment of the intermittent feed-wheel, substantially as described.

6. In a series photographic device, the combination of a feed-wheel adapted to engage the film to feed it, and means for rotating the wheel, with means for engaging the film with opposite sides of the wheel before and after exposure, substantially as described.

7. In a series photographic device, a feed-wheel adapted to engage the film to give it intermittent motion, a toothed wheel attached to the shaft of the feed-wheel and composed of two toothed plates adjustable by an angular motion one upon the other, and a rotating wheel having a cam-flange engaging therewith, substantially as described.

8. In a series photographic device, the combination of a feed-wheel adapted to engage and move the film, means coacting with the feed-wheel to present the film for exposure, and a rotating shaft connected to and operating said feed-wheel, with a shutter fixed upon said shaft and revolving between the film and the lens, substantially as described.

9. In a series photographic device, the combination of a feed-wheel adapted to engage and move the film, means coacting with the feed-wheel to present the film for exposure, and a toothed wheel attached to the feed-wheel and composed of two toothed plates adjustable angularly upon each other, with a shaft, a wheel on the shaft having a cam-flange engaging the toothed wheel to move it intermittently, and a shutter attached to the shaft and revolving between the lens and film, substantially as described.

10. In a series photographic device, the combination of a feed-wheel adapted to engage the film to feed it, guide-rollers engaging the film to hold it in contact with the feed-wheel, and separated exposing-rollers receiving the film from one of the guide-rollers and returning it to the other, with a mirror located back of and between the exposing-rollers, substantially as described.

LEO GRUBMAN.

Witnesses:
ELY SEMONS,
ALEXANDER SEMONS.